(12) United States Patent
Chang et al.

(10) Patent No.: US 9,816,868 B2
(45) Date of Patent: Nov. 14, 2017

(54) DEVICE FOR MEASURING TEMPERATURE DISTRIBUTION

(75) Inventors: Ki Soo Chang, Daejeon-Si (KR); Hae Young Choi, Chungcheongbuk-do (KR); Seon Young Ryu, Chungcheongbuk-do (KR); Geon Hee Kim, Daejeon-Si (KR); Sun Cheol Yang, Daejeon-Si (KR)

(73) Assignee: Korea Basic Science Institute, Daejeon (KR)

( * ) Notice: Subject to any disclaimer, the term of this patent is extended or adjusted under 35 U.S.C. 154(b) by 998 days.

(21) Appl. No.: 13/997,547

(22) PCT Filed: Dec. 1, 2011

(86) PCT No.: PCT/KR2011/009268
§ 371 (c)(1),
(2), (4) Date: Aug. 2, 2013

(87) PCT Pub. No.: WO2012/086942
PCT Pub. Date: Jun. 28, 2012

(65) Prior Publication Data
US 2013/0301676 A1    Nov. 14, 2013

(30) Foreign Application Priority Data
Dec. 22, 2010 (KR) ......................... 10-2010-0132630

(51) Int. Cl.
*G01K 3/00* (2006.01)
*G01K 3/06* (2006.01)
(Continued)

(52) U.S. Cl.
CPC .............. *G01K 3/06* (2013.01); *G01J 5/0003* (2013.01); *G01J 5/047* (2013.01); *G01J 5/0803* (2013.01);
(Continued)

(58) Field of Classification Search
CPC ....... G01K 3/06; G01K 11/125; G01J 5/0806; G01J 5/047; G01J 5/0809; G01J 5/0803;
(Continued)

(56) References Cited

U.S. PATENT DOCUMENTS 5,785,651 A * 7/1998 Kuhn ................... G01B 11/026
250/339.06
7,444,260 B2 * 10/2008 Raad .................... G01K 11/125
702/130

(Continued)

FOREIGN PATENT DOCUMENTS

JP      06-147999 A     5/1994
JP      2000-171728 A   6/2000
(Continued)

OTHER PUBLICATIONS

Office Action issued in corresponding Korean Application No. 10-2010-0132630 with English translation dated Oct. 31, 2013 (5 pages).

(Continued)

*Primary Examiner* — Lisa Caputo
*Assistant Examiner* — Janice M Soto
(74) *Attorney, Agent, or Firm* — Osha Liang LLP

(57) ABSTRACT

The present invention pertains to a device for measuring a temperature distribution, which can measure a temperature distribution without contacting a minor sample having a three-dimensional structure. More particularly, the device for measuring the temperature distribution can measure a three-dimensional temperature distribution for a sample, wherein the temperature distribution in a depth direction (direction z) of the sample is measured by a thermo-reflectance technique using a chromatic dispersion lens, a diffraction spectrometer and an optical detection array; and the temperature distribution in parallel directions (direction x-y axes) of the sample is measured by the thermo-reflectance technique using a biaxial scanning mirror.

9 Claims, 2 Drawing Sheets

(51) Int. Cl.
*G01J 5/00* (2006.01)
*G01J 5/04* (2006.01)
*G01J 5/08* (2006.01)
*G01K 11/12* (2006.01)

(52) U.S. Cl.
CPC ........... *G01J 5/0806* (2013.01); *G01J 5/0809* (2013.01); *G01J 5/0846* (2013.01); *G01K 11/125* (2013.01); *G01J 2005/0077* (2013.01); *G01J 2005/0081* (2013.01)

(58) Field of Classification Search
CPC ................... G01J 5/0003; G01J 5/0846; G01J 2005/0081; G01J 2005/0077
USPC ............................................. 348/79; 356/301
See application file for complete search history.

(56) References Cited

U.S. PATENT DOCUMENTS

| | | | | |
|---|---|---|---|---|
| 2001/0022341 | A1* | 9/2001 | Adachi | G02B 21/0032 250/216 |
| 2007/0019921 | A1* | 1/2007 | Yonekubo | G03B 21/006 385/147 |
| 2007/0123761 | A1* | 5/2007 | Daly | A61B 3/1005 600/316 |
| 2009/0084959 | A1 | 4/2009 | Hudgings et al. | |
| 2010/0253618 | A1* | 10/2010 | Nishigaki | G06F 3/0423 345/156 |

FOREIGN PATENT DOCUMENTS

| | | |
|---|---|---|
| JP | 2002122480 A | 4/2002 |
| JP | 2006-300748 A | 11/2006 |
| JP | 2007-010424 A | 1/2007 |

OTHER PUBLICATIONS

International Search Report issued in PCT/KR2011/009268 dated Jul. 11, 2012 (4 pages).

Written Opinion of the International Searching Authority issued in PCT/KR2011/009268 dated Jul. 11, 2012 (7 pages).

Farzaneh, M. et al.; "CCD-based thermoreflectance microscopy: principles and applications"; Journal of Physics D: Applied Physics, vol. 42, (2009) 143001, pp. 1-20 (20 pages).

* cited by examiner

DEVICE FOR MEASURING TEMPERATURE DISTRIBUTION

TECHNICAL FIELD

The present invention relates to a device for measuring a temperature distribution capable of measuring a temperature distribution without contacting a sample having a three-dimensional structure, and more particularly, wherein the temperature distribution in a depth direction (direction z) of the sample is measured by a thermo-reflectance technique using a chromatic dispersion lens, a diffraction spectrometer and an optical detection array, and the temperature distribution in parallel directions (directions of x-y axes) of the sample is measured by the thermo-reflectance technique using a biaxial scanning mirror.

BACKGROUND ART

It is important to measure thermal distribution characteristics of micro devices, such as semiconductor devices, photoelectric devices, or the like, so as to evaluate and improve performances of the devices. According to a known non-contact thermo-distribution measuring method, there has been an infrared thermography technique, in which the infrared radiation emitted from a sample is directly measured using an infrared camera. The infrared thermography technique has a spatial resolving power of about 3 um, due to a diffraction limit caused by middle range infrared radiation used to form a temperature image, while the infrared thermography technique can realize a high temperature resolving power of about 10 mK to 20 mK. Thus, in order to realize a high spatial resolving power of less than 1 um, it is necessary to use a short wavelength light. Because of these reason, various thermo-reflectance techniques have been reported to use a visible or ultraviolet range wavelength light. According to the techniques, the short wavelength lights in an ultraviolet or visible light band illuminate a sample and a relative reflectance change depending on a temperature change is measured so that the temperature distribution of the sample can be extracted. One of the techniques is depicted in M. Farzanech et. al. J. Phys. D. vol. 42, p.143001, 2009. In this paper, since light having a wavelength of less than 500 nm is used in the technique, the technique has an advantage that a high spatial resolving power of about 250 nm can be realized, and a temperature resolving power of about 10 mK can also be realized. However, the proposed technique is limited to measuring a temperature distribution on a two-dimensional surface.

U.S. Patent Application No. 2009/0084959 discloses thermo-reflectance thermography using a confocal microscope based on a Nipkow disk. The invention relates to a technique for measuring a temperature distribution of a device which has a three-dimensional structure packaged in a transparent material.

According to U.S. Patent Application No. 2009/0084959, a two-dimensional temperature distribution in a focal region can be measured with a high spatial resolving power using a thermo-reflectance technique. However, the method has a disadvantage that a sample or a lens system needs to be moved in a depth direction so as to perform three-dimensional measurement.

Thus, the mechanical vibration which is caused by movement of the sample or system is one factor of errors in temperature measurement. Furthermore, since the sample or a measurement system is moved in a vertical direction, a long measurement time is an obstacle of a real-time three-dimensional temperature distribution measurement.

DISCLOSURE

Technical Problem

The present invention provides a device and method for measuring a three-dimensional temperature distribution of a sample without using a mechanical transferring device in a depth direction of the sample.

Technical Solution

One aspect of the present invention provides a device for measuring a temperature distribution, including: a light source that provides light in which rays having a plurality of wavelengths are mixed; a chromatic dispersion lens that performs a function of separating a beam emitted from the light source according to wavelength; an objective lens that focuses light separated by the chromatic dispersion lens; and a detector that detects light reflected after the light illuminates an object sample, wherein the light is focused according to a depth of the object sample depending on a wavelength of the light delivered through the objective lens, and optical signals are reflected from each focus and are detected.

The device may further include a biaxial scanning mirror that is disposed between the light source and the chromatic dispersion lens and performs a function of scanning an incident beam in a two-dimensional manner.

The detecting part may include a diffraction grid and an optical signal detector array, and may simultaneously detect optical signals according to wavelength.

The detecting part may include a single photoarray and may detect a signal according to wavelength.

A pin hole may be further disposed in the detecting part and may allow only the light reflected from each focus according to wavelength to pass and to go into the diffraction grid or single photoarray. The device may further include an optical beamsplitter disposed between the light source, the sample unit, and the detecting part.

Effects of the Invention

According to the present invention, the three-dimensional temperature distribution can be measured without using a mechanical transferring device in a depth direction of the sample, differently from an existing thermo-reflectance microscope based on a confocal microscope. The degree of accuracy of three-dimensional temperature distribution measurement can be improved and real-time temperature distribution measurement can be performed.

MODES OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Figure 1:
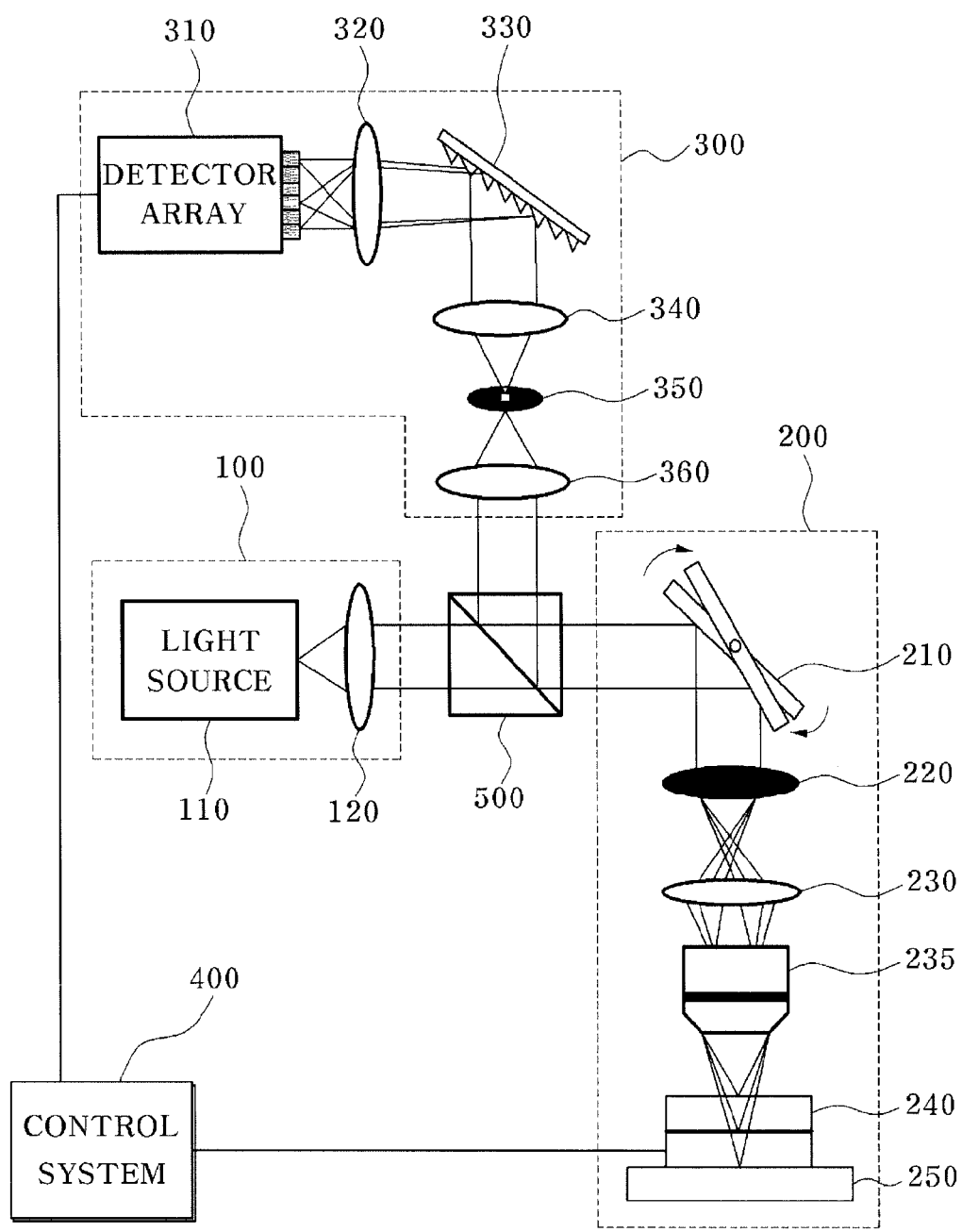
FIG. 1 is a schematic view illustrating the configuration of a device for measuring a three-dimensional temperature distribution according to an exemplary embodiment of the present invention.

FIG. 1 is a schematic view illustrating the configuration of a device for measuring a three-dimensional temperature distribution according to an exemplary embodiment of the present invention.

Referring to FIG. 1, the device for measuring the three-dimensional temperature distribution according to an exemplary embodiment of the present invention includes a light source unit 100, a sample unit 200, a detecting part 300, and a control system 400.

The light source unit 100 includes a light source 110 that provides light in which rays having a plurality of wavelengths are mixed, and an optical system 120 that collimates the light into a parallel beam. A light source that may obtain a generally wide wavelength line width, for example, white light having multiple rays, a light emitting diode (LED), a solid light source, or the like, may be used as the light source 110. The light source unit 100 may include a collimating lens as the optical system 120 for emitting light from the light source 110 as the parallel light and further includes a wavelength filter (not shown) that selects only a predetermined wavelength.

The sample unit 200 includes a biaxial scanning mirror 210, a chromatic dispersion lens 220, an objective lens 235, and a sample-fixing device 250 that enables a temperature change of the sample. The sample unit 200 may further include, at the objective lens 235, an optical system 230 for condensing a beam that passes through the chromatic dispersion lens 220.

The biaxial scanning mirror 210 performs the function of scanning an incident beam in a two-dimensional manner and may be one selected from a galvano-mirror, a polygon mirror, an acoustic optical deflector (AOD), a digital micro-mirror device (DMD), and a raster scanner.

The chromatic dispersion lens 220 performs the function of separating a beam in which multiple rays are mixed according to wavelength, and the objective lens 235 performs the function of densely focusing the beam separated by the chromatic dispersion lens 220. The sample-fixing device 250 in which the sample is supported may be configured to enable a temperature change of the sample.

The detecting part 300 includes a pin hole 350, a light receiving lens 320, a diffraction grid 330, and an optical signal detector array 310. Optical systems 360 and 340 for performing the function of condensing and collimating the beam before and after the beam passes through the pin hole 350, respectively, may be added to the detecting part 300.

The detecting part 300 includes the pin hole 350 together with the light receiving lens 320, allows only a condensed ray to pass through the pin hole 350, and prevents progression of rays condensed in other regions than the pin hole 350, thereby allowing a beam reflected from each focus according to wavelength to selectively pass through the pin hole 350.

The beam that selectively passes through the pin hole 350 is separated by the diffraction grid 330 according to wavelength and then is detected by the optical signal detector array 310.

The optical signal detector array 310 may be configured in such a way that a plurality of optical signal detectors including a charge-coupled device (CCD), a photodetector, an avalanche photo diode (APD) and a photo multiplier tube (PMT) are arranged.

Meanwhile, an optical beam splitter 500 performs the function of delivering a beam emitted from the light source unit 100 to the sample unit 200 and delivering the beam reflected from the sample unit 200 to the detecting part 300. Since the optical beam splitter 500 is not directly required in temperature distribution measurement, the optical coupler 500 may be selectively removed when the arrangement of FIG. 1 is modified. However, in the configuration of FIG. 1, the optical beam splitter 500 is inserted so as to separate light output from the light source unit 100 and light output from the sample unit 200 from each other.

The control system 400 is configured of hardware and software including the sample-fixing device 250 for the sample for thermo-reflectance measurement, the detecting part 300, a signal generator (not shown) for synchronization with temperature control, and a measured signal processor (not shown).

Next, an operation of the device for measuring the three-dimensional temperature distribution according to an exemplary embodiment of the present invention will be described in detail with reference to FIG. 1.

When light in which rays having a plurality of wavelengths are mixed is provided from the light source 110, the optical system 120 collimates the light into a parallel beam. The light that becomes the parallel light passes through the optical beamsplitter 500 and is directed by the biaxial scanning mirror 210 toward the chromatic dispersion lens 220.

When a chromatic dispersion beam generated from the chromatic dispersion lens 220 passes through the objective lens 235, the chromatic dispersion beam is focused according to the depth of the sample, depending on the wavelength of the light, and the optical signals are reflected from each focus.

The optical signals are delivered to the detecting part 300. In more detail, only a beam that passes through the pin hole 350 is separated by the diffraction grid 330 and signals according to wavelength are delivered to the detecting part 300. In this case, the signals according to wavelength are simultaneously measured by the detector array 310. In this manner, the temperature distribution according to the depth of the sample can be measured without using a mechanical transferring device.

Meanwhile, the beam is scanned in horizontal and vertical directions of the sample using the biaxial scanning mirror 210, thereby measuring the three-dimensional temperature distribution of the sample. In this case, the temperature distribution can be measured using a general thermo-reflectance technique for measuring a reflectance change according to a temperature change of the sample.

Figure 2:
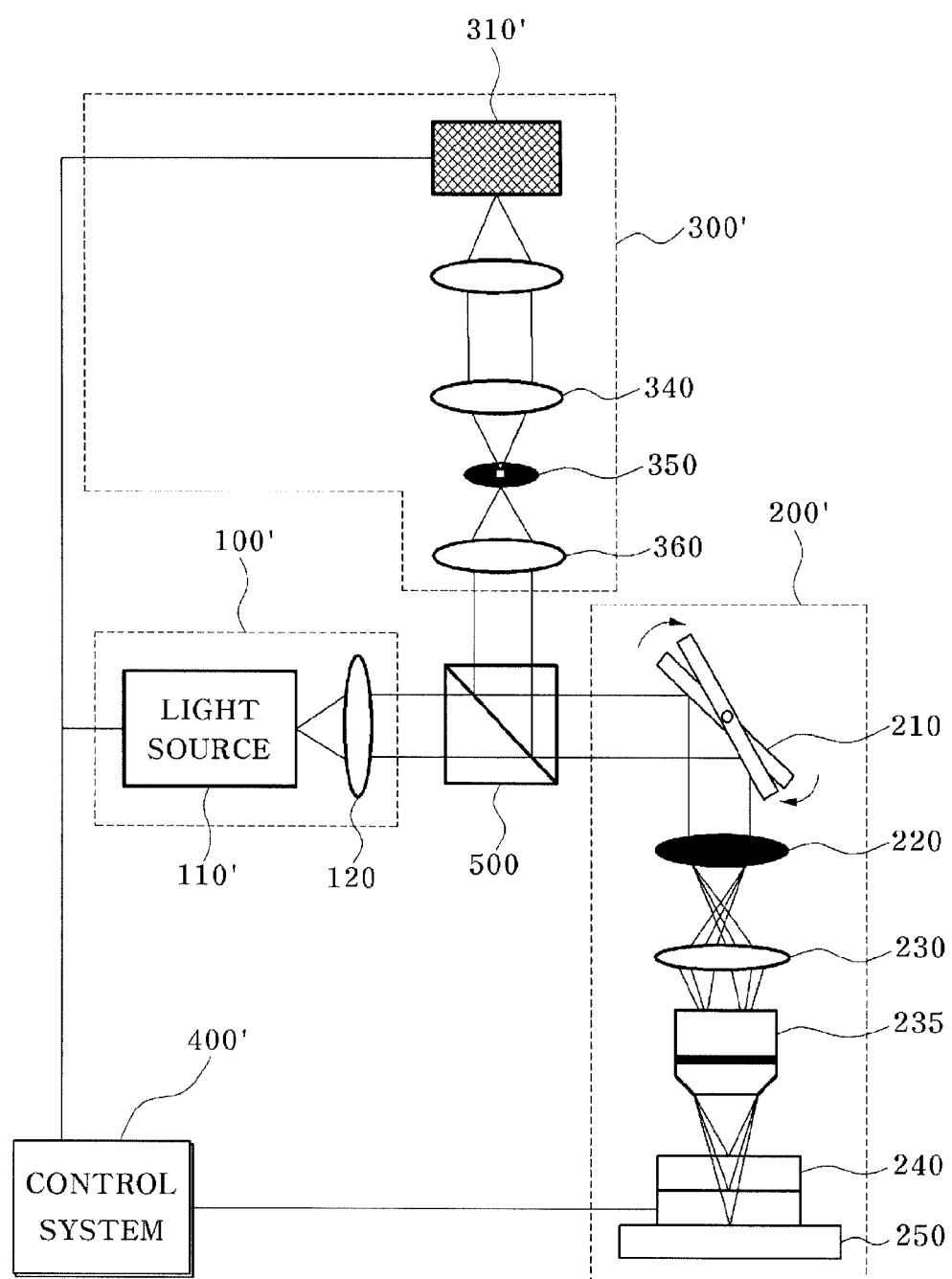
FIG. 2 is a conceptual view for explaining a device for measuring a temperature distribution according to another exemplary embodiment of the present invention.

FIG. 2 is a schematic view illustrating the configuration of a device for measuring a temperature distribution according to another exemplary embodiment of the present invention. Referring to FIG. 2, the device for measuring the temperature distribution according to another exemplary embodiment of the present invention includes a light source unit 100', a sample unit 200', a detecting part 300', and a control system 400'.

The device for measuring the temperature distribution of FIG. 2 is different from the device for measuring the three-dimensional temperature distribution of FIG. 1 by the light source unit 100 and the detecting part 300 of FIG. 1. That is, instead of the diffraction grid 330 and the optical signal detector array 310, the device for measuring the temperature distribution of FIG. 2 includes a tunable light source 110' and a single photodetector 310'. A swept source or tunable laser source that generates different wavelengths over time may be used as the tunable light source 110', and for example, light having different wavelengths over time may also be delivered to an outside of the white light using a tunable filter (not shown).

Meanwhile, in FIG. 2, scanning is performed by separating light according to wavelength. That is, when a light source transferred by the tunable light source 110' to the sample is scanned according to wavelength over time and is transferred to the detecting part 300', the detector 300' of FIG. 2 does not need to detect several wavelength signals at one time, and even when the single photodetector 310' is used, a signal according to wavelength over time can be detected. In order to support the operation, the function of the control system 400' is slightly changed from that in FIG. 1. It is efficient to configure the control system 400' in such a way that temperature of one period varies while one line is measured in the depth direction of the sample and four or more detections are performed in one period. The control system 400' is connected to the light source unit 100' so that temperature change and detection may be synchronized while the light source varies according to wavelength.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A device for measuring a three-dimensional temperature distribution, comprising:
    a light source that provides light having wide wavelength line width;
    a chromatic dispersion lens that performs a function of separating a beam emitted from the light source according to wavelength;
    an objective lens that focuses light separated by the chromatic dispersion lens;
    a detecting part that detects light reflected after the light is illuminated onto an object sample; and
    a biaxial scanning mirror that is disposed between the light source and the chromatic dispersion lens and performs a function of scanning an incident beam in a two-dimensional manner,
    wherein the light is focused according to a depth of the object sample depending on a wavelength of the light delivered through the objective lens, and an optical signal is reflected from the focus and detected, and
    wherein the three-dimensional temperature distribution is measured using a reflectance change according to a temperature change of the sample.

2. The device of claim 1, wherein the detecting part comprises a diffraction grid and an optical signal detector array and simultaneously detects optical signals according to wavelength.

3. The device of claim 2, wherein a pin hole is further disposed in the detecting part and allows the light reflected from each focus according to wavelength to pass through the pin hole and to go into the diffraction grid or single photoarray.

4. The device of claim 1, wherein the detecting part comprises a single photoarray and detects optical signals according to wavelength.

5. The device of claim 4, wherein the light source uses a swept source or tunable laser source that generates different wavelengths over time or outputs light having different wavelengths over time using a tunable filter disposed outside the light source.

6. The device of claim 4, wherein a pin hole is further disposed in the detecting part and allows the light reflected from each focus according to wavelength to pass through the pin hole and to go into the diffraction grid or single photoarray.

7. The device of claim 1, further comprising an optical beam splitter disposed between the light source, the sample unit, and the detecting part.

8. The device of claim 1, wherein the biaxial scanning mirror performs a function of scanning the incident beam in a two-dimensional manner and is one selected from the group consisting of a galvanic mirror, a polygon mirror, an acoustic optical deflector (AOD), a digital micromirror device (DMD), and a raster scanner.

9. The device of claim 1, wherein the light source is selected from the group consisting of white light having multiple rays, a light emitting diode (LED), and a solid light source.

* * * * *